(12) United States Patent
Wang et al.

(10) Patent No.: US 12,083,883 B2
(45) Date of Patent: Sep. 10, 2024

(54) METHOD AND SYSTEM FOR PERSONALIZED CAR FOLLOWING WITH TRANSFORMERS

(71) Applicant: Toyota Motor Engineering & Manufacturing North America, Inc., Plano, TX (US)

(72) Inventors: Ziran Wang, San Jose, CA (US); Zhouqiao Zhao, Riverside, CA (US); Rohit Gupta, Santa Clara, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 237 days.

(21) Appl. No.: 17/567,504

(22) Filed: Jan. 3, 2022

(65) Prior Publication Data

US 2023/0211660 A1 Jul. 6, 2023

(51) Int. Cl.
*B60K 31/00* (2006.01)
*G05B 13/02* (2006.01)
*G08G 1/01* (2006.01)

(52) U.S. Cl.
CPC ........ *B60K 31/0058* (2013.01); *G05B 13/027* (2013.01); *G08G 1/0125* (2013.01); *G05B 2219/43027* (2013.01); *G08G 1/01* (2013.01)

(58) Field of Classification Search
CPC .............. B60K 31/0058; G05B 13/027; G05B 2219/43027; G08G 1/0125; G08G 1/01
See application file for complete search history.

(56) References Cited

U.S. PATENT DOCUMENTS

| 9,950,707 B2 | 4/2018 | Tan et al. |
| 10,535,191 B2 | 1/2020 | Sachdeva et al. |

(Continued)

FOREIGN PATENT DOCUMENTS

| CN | 110936958 A | * | 3/2020 | |
| CN | 110949386 A | * | 4/2020 | ............ B60W 10/06 |

(Continued)

OTHER PUBLICATIONS

H.W. Deng, M. Rahman, M. Chowdhury, M.S. Salek, and M. Shue, "Commercial cloud computing for connected vehicle applications in transportation cyber-physical systems: a case study," IEEE Intelligent Transportation Systems Magazine, vol. 13, No. 1, pp. 6-19, 2021.

K.M. Alam and A. El Saddik, "C2PS: A digital twin architecture reference model for the cloud-based cyber-physical systems," IEEE Access, vol. 5, pp. 2050-2062, 2017.

(Continued)

*Primary Examiner* — Behrang Badii
*Assistant Examiner* — Jay Khandpur
(74) *Attorney, Agent, or Firm* — DINSMORE & SHOHL LLP

(57) ABSTRACT

A method comprises determining a vectorized representation of positions of road agents and road geometry based on sensor data from a vehicle, inputting the vectorized representation of the positions of the road agents and the road geometry into a trained transformer network, predicting one or more road agent trajectories at one or more future time steps based on an output of the transformer network, predicting an acceleration of the vehicle at the one or more future time steps based on the predicted one or more road agent trajectories at the one or more future time steps, and causing the vehicle to perform the predicted acceleration at the one or more future time steps.

18 Claims, 9 Drawing Sheets

(56) References Cited

U.S. PATENT DOCUMENTS

| | | | |
|---|---|---|---|
| 10,839,263 | B2 | 11/2020 | Thompson et al. |
| 10,843,689 | B2 | 11/2020 | Jiang et al. |
| 11,776,215 | B1 * | 10/2023 | Cheng .................... G06N 5/04 |
| | | | 345/419 |
| 11,781,404 | B2 * | 10/2023 | Beary ................ E21B 43/2406 |
| | | | 166/305.1 |
| 2019/0384870 | A1 | 12/2019 | Shiraishi et al. |
| 2021/0150350 | A1 | 5/2021 | Gao et al. |
| 2021/0157282 | A1 * | 5/2021 | Abeloe .................. G06N 3/082 |
| 2022/0036184 | A1 * | 2/2022 | Liu ....................... G06N 3/045 |
| 2023/0040006 | A1 * | 2/2023 | Weiss ............. B60W 60/00274 |
| 2023/0213945 | A1 * | 7/2023 | Sajjan ................. G05D 1/0248 |
| | | | 701/28 |
| 2023/0230471 | A1 * | 7/2023 | Guney ................ B60W 60/001 |
| | | | 701/26 |

FOREIGN PATENT DOCUMENTS

| | | |
|---|---|---|
| CN | 111401184 A | 7/2020 |
| DE | 102013100569 A1 | 7/2014 |

OTHER PUBLICATIONS

S.A. Kumar, R. Madhumathi, P. R. Chelliah, L. Tao, and S. Wang, "A novel digital twin-centric approach for driver intention prediction and traffic congestion avoidance," Journal of Reliable Intelligent Environments, vol. 4, No. 4, pp. 199-209, 2018.

Z. Wang, X. Liao, X. Zhao, K. Han, P. Tiwari, M.J. Barth, and G. Wu, "A digital twin paradigm: Vehicle-to-cloud based advanced driver assistance systems," in 2020 IEEE 91st Vehicular Technologty Conference, May 2020, pp. 1-6.

* cited by examiner

METHOD AND SYSTEM FOR PERSONALIZED CAR FOLLOWING WITH TRANSFORMERS

TECHNICAL FIELD

The present specification relates to autonomous driving and more particularly to a method and system for personalized car following with transformers.

BACKGROUND

Autonomous or semi-autonomous vehicles may perform certain driving functions without any input by the driver. In particular, cruise control functionality may allow a driver to set a desired speed for a vehicle and cause the vehicle to maintain the desired speed without the driver utilizing the accelerator or brake pedals. Adaptive cruise control (ACC) functionality may similarly cause a vehicle to maintain a desired speed while also maintaining a certain following distance from other vehicles. That is, an ACC system may cause a vehicle to slow down from the desired speed if another vehicle is detected within a threshold distance in front of the vehicle.

Thus, ACC may allow a driver to maintain a constant speed while driving a vehicle, while also keeping the vehicle a certain distance behind other vehicles to prevent collisions. However, different drivers may have different naturalistic driving behaviors when following other vehicles while driving manually. For example, different drivers may have different desired following distances, and different desired rates of acceleration or deceleration when a change of speed is needed. Furthermore, drivers may have different driving behaviors at different times of day and in different driving conditions. As such, a typical ACC system may exhibit driving behavior that is different than the naturalistic driving behavior of a driver, which may be uncomfortable for the driver. Therefore, personalized adaptive cruise control (P-ACC) may be desired, which mimics the naturalistic driving behavior of a driver. Accordingly, a need exists for improved methods and systems for P-ACC.

SUMMARY

In an embodiment, a method may include determining a vectorized representation of a position or road agents and road geometry based on sensor data from a vehicle, inputting the vectorized representation of the positions of the road agents and the road geometry into a trained transformer network, predicting one or more road agent trajectories at one or more future time steps based on an output of the transformer network, predicting an acceleration of the vehicle at the one or more future time steps based on the predicted one or more road agent trajectories at the one or more future time steps, and causing the vehicle to perform the predicted acceleration at the one or more future time steps.

In another embodiment, a remote computing device may include a controller. The controller may determine a vectorized representation of positions of road agents and road geometry based on sensor data from a vehicle. The controller may input the vectorized representation of the positions of the road agents and the road geometry into a trained transformer network. The controller may predict one or more road agent trajectories at one or more future time steps based on an output of the transformer network. The controller may predict an acceleration of the vehicle at the one or more future time steps based on the predicted one or more road agent trajectories at the one or more future time steps. The controller may cause the vehicle to perform the predicted acceleration at the one or more future time steps.

A system may include a vehicle including one or more vehicle sensors and a remote computing device including a controller. The vehicle sensors may collect sensor data including positions of road agents at a plurality of time steps and road geometry. The controller of the remote computing device may determine a vectorized representation of the positions of the road agents and the road geometry based on the sensor data from the vehicle. The controller may input the vectorized representation of the positions of the road agents and the road geometry into a trained transformer network. The controller may predict one or more road agent trajectories at one or more future time steps based on an output of the transformer network. The controller may predict an acceleration of the vehicle at the one or more future time steps based on the predicted one or more road agent trajectories at the one or more future time steps. The vehicle may receive the predicted acceleration and perform the predicted acceleration at the one or more future time steps.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for personalized car following with transformers. In embodiments disclosed herein, as a driver drives a vehicle, vehicle sensors (e.g., LiDAR sensors) may detect road geometry and other vehicles on the road. This data may be transformed to birds-eye-view data, and the birds-eye-view data may then be transformed into a vectorized representation of the road geometry and the other vehicles. This vectorized data may comprise features that are sent to a transformer network.

Each time that a driver goes on a driving trip, this type of vectorized data about road geometries, other vehicles on the road, and other data may be collected. This data may indicate the personalized driving behavior that the driver engages in while following other vehicles. After sufficient data associated with the driver is collected, the data may be input to a transformer network as training data and the transformer network may be trained based on the training data to predict the vehicle acceleration at a future time step based on the data associated with a current time step. That is, the transformer network may be trained to predict the driver's driving behavior in a variety of driving situations.

In some examples, vehicle sensors may also collect other data associated with the vectorized data such as time of day and weather conditions. This vectorized data may be classified into different sub-categories based on the associated data and different transformer networks may be trained to predict the driver's driving behavior for different categories. For example, one transformer network may be trained to predict the driver's driving behavior in the morning, while another transformer network may be trained to predict the driver's driving behavior in the evening.

After one or more transformer networks are trained to predict the driver's driving behavior, the transformer networks may be used as part of a P-ACC system. Specifically, as a driver drives the vehicle using P-ACC, the vehicle sensors may collect data as described above. The collected data may be transformed into vectorized data and classified into a particular category. An appropriate transformer network may be selected based on the classification and the vectorized data may be input to the selected transformer network. The transformer network may then predict a future vehicle acceleration that the driver would perform if they were driving the vehicle manually without the P-ACC system. The P-ACC system may then cause the vehicle to match the predicted acceleration. As such, the P-ACC system may cause the vehicle to automatically drive in a manner that matches how the driver would drive the vehicle during manual driving, thereby making the driver more comfortable with the P-ACC system.

Figure 1:
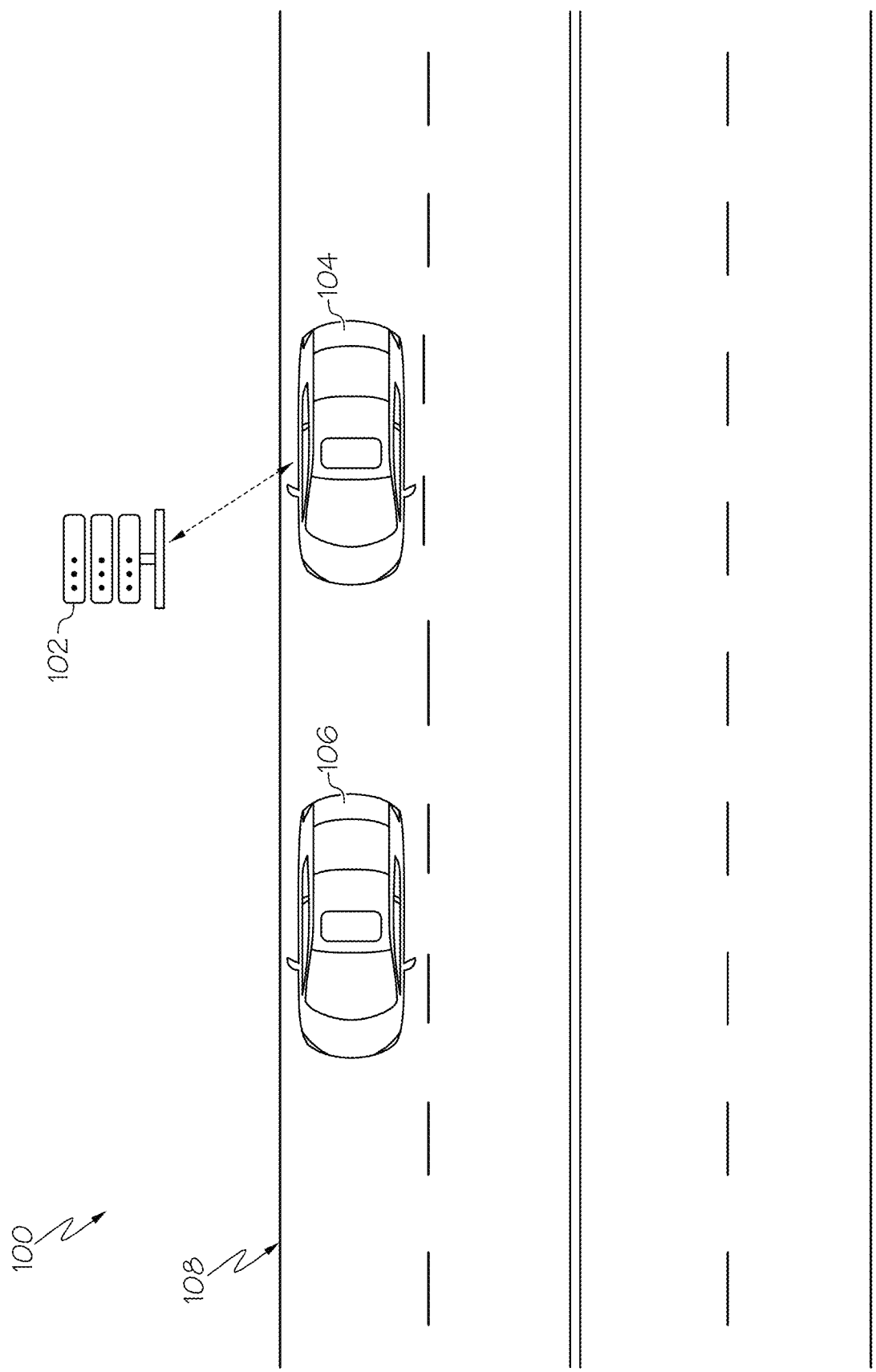
FIG. 1 schematically depicts a system comprising a P-ACC server, according to one or more embodiments shown and described herein.

Turning now to the figures, FIG. 1 schematically depicts a system for personalized car following with transformers. A system 100 includes a P-ACC server 102. The P-ACC server 102 may receive data from connected vehicles and may utilize one or more transformer networks to implement P-ACC, as disclosed herein. In the example of FIG. 1, an ego vehicle 104 drives behind a vehicle 106 along a road 108.

In the example of FIG. 1, the vehicle 104 may be manually driven by a driver and may have a P-ACC system, as disclosed herein. In the example of FIG. 1, the vehicle 104 is a connected vehicle. A connected vehicle is able to communicate remotely with systems outside of the vehicle (e.g., with the P-ACC server 102).

The P-ACC server 102 may be communicatively coupled to the vehicle 104. While the example of FIG. 1 illustrates a single vehicle 104 being communicatively coupled to the P-ACC server 102, in other examples, any number of connected vehicles may be communicatively coupled to the P-ACC server 102.

In the illustrated example, the P-ACC server 102 comprises a cloud computing device. In some examples, the P-ACC server 102 may comprise a road-side unit (RSU) positioned near the road 108. In these examples, the system 100 may include any number of RSUs spaced along the road 108 such that each RSU covers a different service area. That is, as the vehicle 104 or other vehicles drive along the road 108, the vehicles may be in range of different RSUs at different times such that different RSUs provide coverage at different locations. Thus, as the vehicle 104 drives along the road 108, the vehicle 104 may move between coverage areas of different RSUs.

In other examples, the P-ACC server 102 may be another type of server or remote computing device and may be positioned remotely from the road 108. In some examples, the P-ACC server 102 may be an edge server. In some examples, the P-ACC server 102 may be a moving edge server, such as another vehicle.

Figure 2:
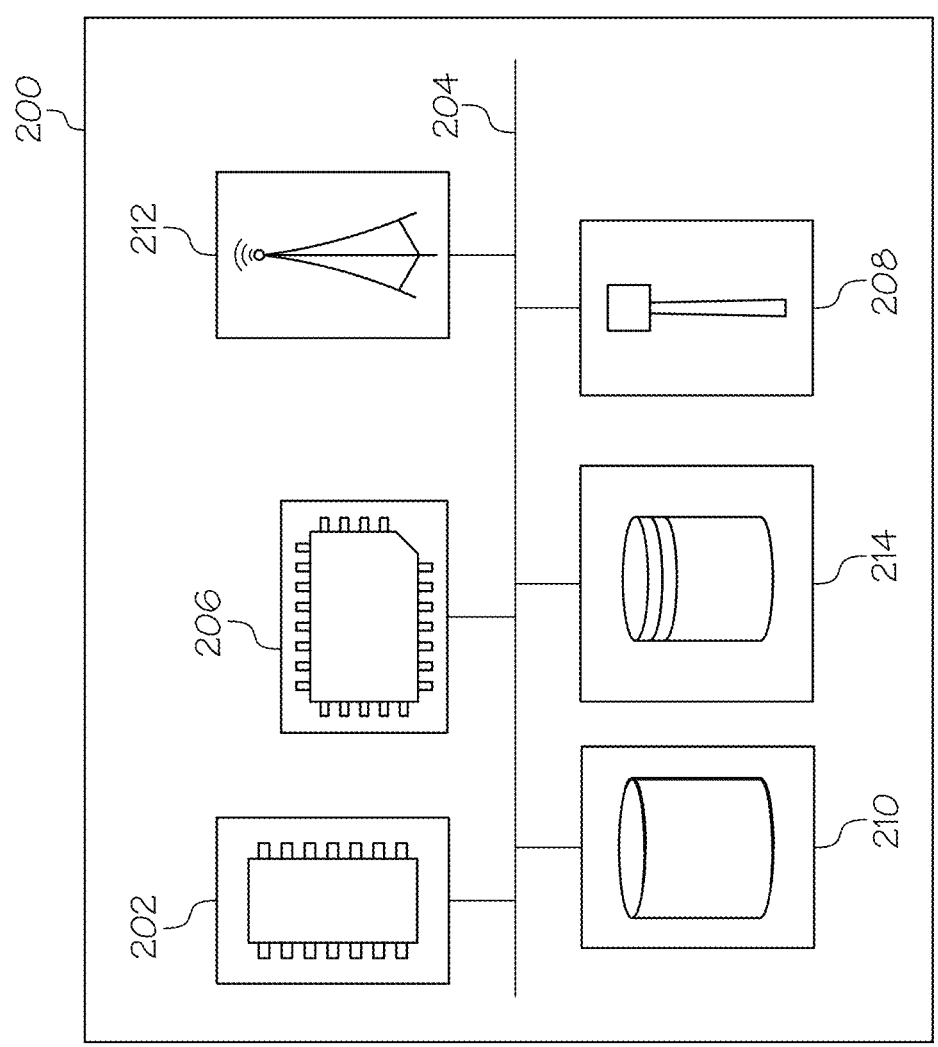
FIG. 2 depicts a schematic diagram of a vehicle system, according to one or more embodiments shown and described herein.

FIG. 2 depicts a vehicle system 200 that may be included in the vehicle 104 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect positions, trajectories, velocities, and accelerations of other vehicles. The vehicle sensors 210 may also detect road geometry and other traffic features. In some examples, the vehicle sensors 210 may also detect weather conditions and other environmental data. The data captured by the vehicle sensors 210 may be stored in the data storage component 214.

Still referring to FIG. 2, the vehicle system 200 comprises network interface hardware 212 for communicatively coupling the vehicle system 200 to the P-ACC server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit data about objects detected by the vehicle system 200, as disclosed in further detail below.

Still referring to FIG. 2, the vehicle system 200 comprises a data storage component 214. The data storage component 214 may store data used by various components of the vehicle system 200. In addition, the data storage component 214 may store data collected by the vehicle sensors 210.

In some embodiments, the vehicle system 200 may be communicatively coupled to the P-ACC server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
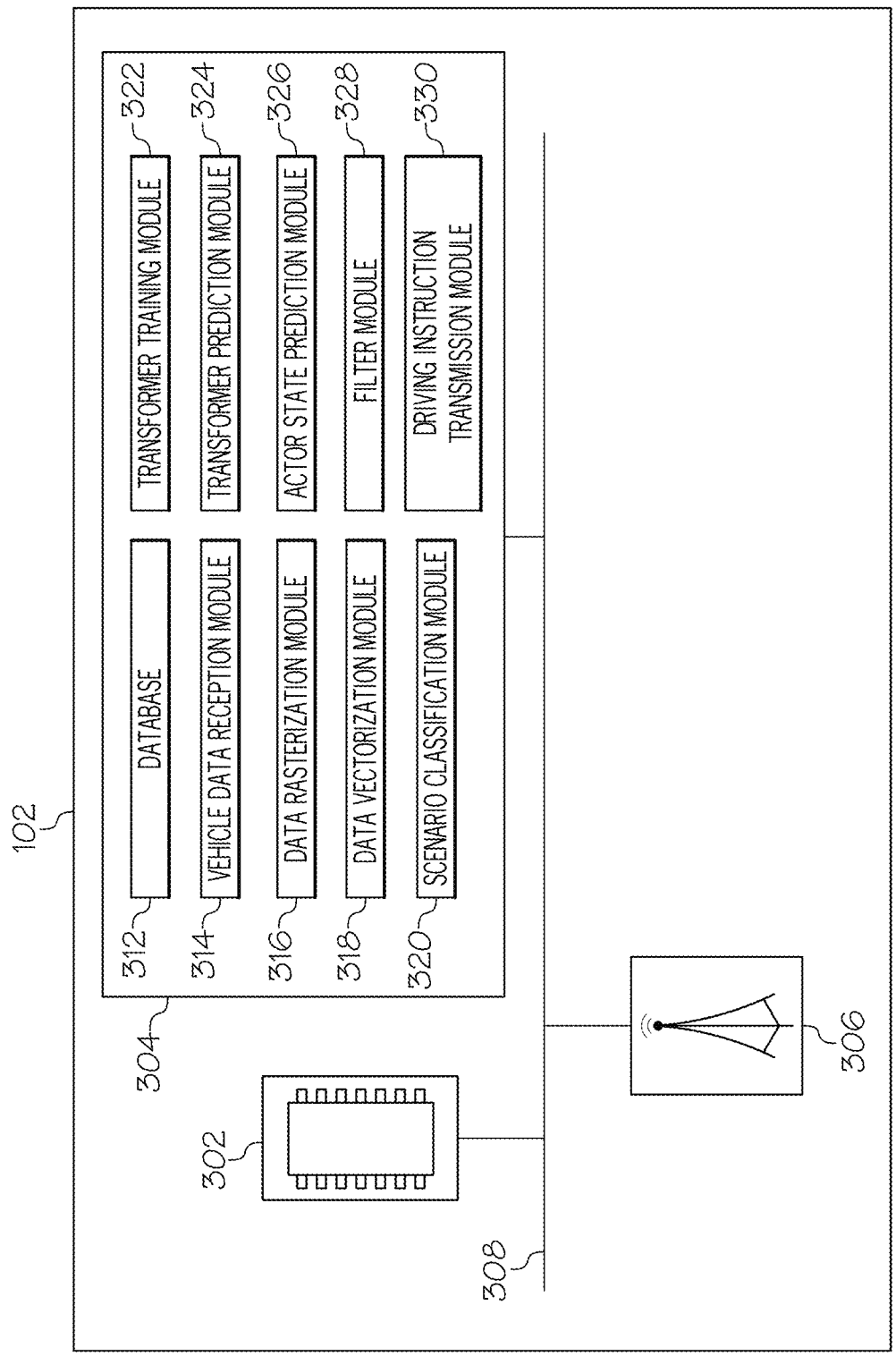
FIG. 3 depicts a schematic diagram of the P-ACC server of FIG. 1, according to one or more embodiments shown and described herein.

Now referring to FIG. 3, the P-ACC server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. In some examples, the network interface hardware 306 may include two different channels including a Dedicated Short-Range Communication (DSRC) channel and a millimeter wave radio channel, as discussed in further detail below. The network interface hardware 306 of the P-ACC server 102 may transmit and receive data to and from vehicles (e.g., the vehicle 104 of FIG. 1).

The one or more memory modules 304 include a database 312, a vehicle data reception module 314, a data rasterization module 316, a data vectorization module 318, a scenario classification module 320, a transformer training module 322, a transformer prediction module 324, an actor state prediction module 326, a filter module 328, and a driving instruction transmission module 330. Each of the database 312, the vehicle data reception module 314, the data rasterization module 316, the data vectorization module 318, the scenario classification module 320, the transformer training module 322, the transformer prediction module 324, the actor state prediction module 326, the filter module 328, and the driving instruction transmission module 330 may be a program module in the form of operating systems, application program modules, and other program modules stored in the one or more memory modules 304. In some embodiments, the program module may be stored in a remote storage device that may communicate with the P-ACC server 102. In some embodiments, one or more of the database 312, the vehicle data reception module 314, the data rasterization module 316, the data vectorization module 318, the scenario classification module 320, the transformer training module 322, the transformer prediction module 324, the actor state prediction module 326, the filter module 328, and the driving instruction transmission module 330 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store data received from the vehicle 104. The data stored in the database 312 may be used by the other modules 304, as disclosed herein. The database 312 may also store parameters for one or more trained transformers, as disclosed herein. The database 312 may also store other data used by the memory modules 304.

The vehicle data reception module 314 may receive data from vehicles (e.g., from the vehicle 104 of FIG. 1). As discussed above, this data may include driving data associated with other drivers, road data associated with road geometry, and environment data associated with weather conditions and the like. The data received by the vehicle data reception module 314 may be stored in the database 312.

The data rasterization module 316 may transform the data received by the vehicle data reception module 314 into rasterized data. In particular, the data rasterization module 316 may determine a rasterization of the vehicle data and road data received by the vehicle data reception module 314. In embodiments, the data rasterization module 316 converts 3D point cloud data collected by the vehicle sensors 210 of the vehicle 104 into a birds-eye-view map.

Figure 4A:
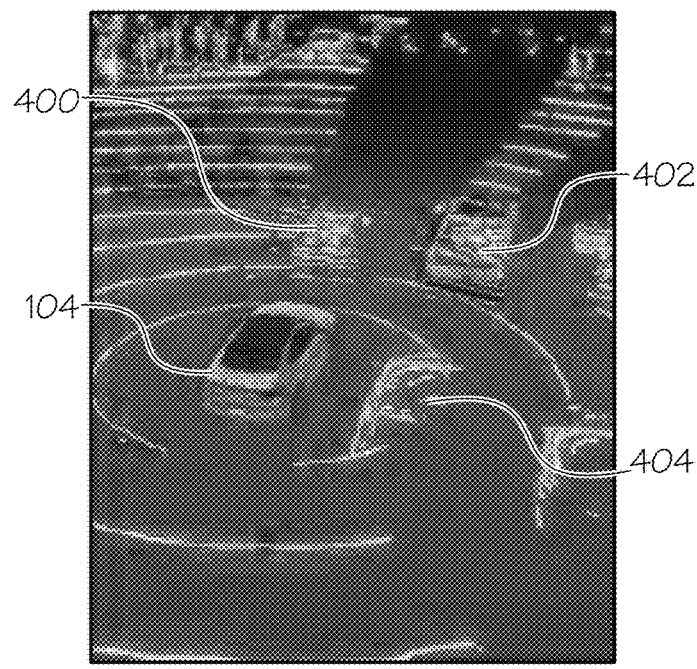
FIG. 4A depicts example point cloud data that may be gathered by the vehicle system of FIG. 2, according to one or more embodiments shown and described herein.

FIG. 4A shows example 3D point cloud data that may be collected by the vehicle sensors 210 (e.g., by LiDAR sensors). In the example of FIG. 4A, the vehicle sensors 210 of the ego vehicle 104 collect 3D point cloud data representing vehicles 400, 402, and 404 positioned around the ego vehicle 104. However, 3D point cloud contains more information than is needed to train and use a transformer network. Accordingly, the data rasterization module 316 transformers the 3D point cloud data to a simpler raster image comprising a 2D birds-eye view of vehicles and road geometry.

Figure 4B:
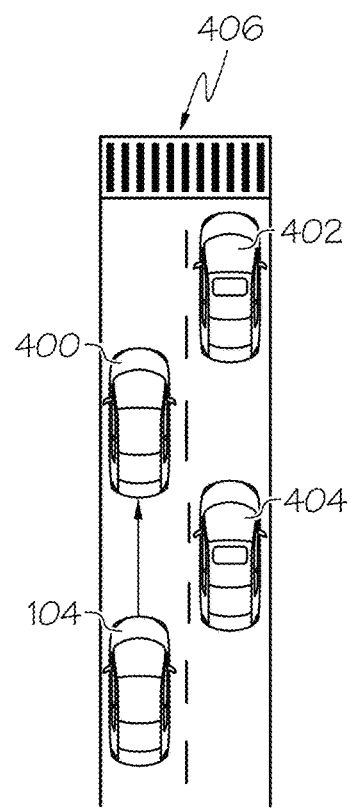
FIG. 4B depicts example rasterized data that may be utilized by the P-ACC server of FIGS. 1 and 3, according to one or more embodiments shown and described herein.

FIG. 4B shows a 2D raster image that may be generated by the data rasterization module 316 from a 3D point cloud image collected by the vehicle sensors 210. In the example of FIG. 4B, the raster image contains the ego vehicle 104, a vehicle 400 in front of the ego vehicle 104, and two other vehicles 402 and 404 in an adjacent lane. The raster image also contains a crosswalk 406.

Figure 4C:
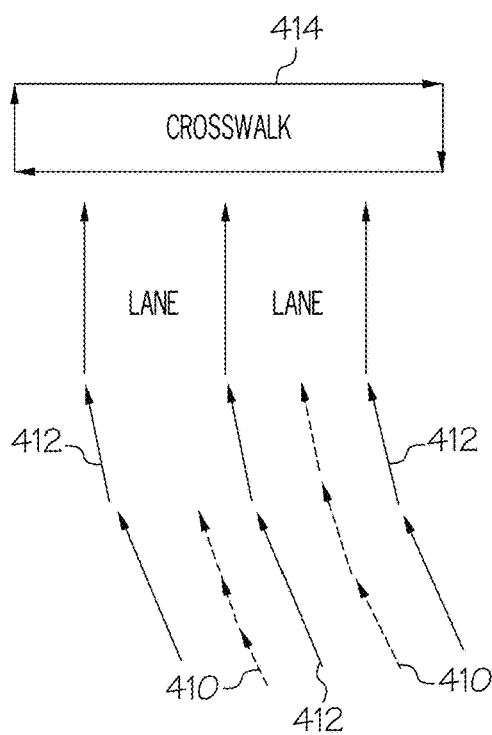
FIG. 4C depicts example vectorized data that may be utilized by the P-ACC server of FIGS. 1 and 3, according to one or more embodiments shown and described herein.
Figure 4D:
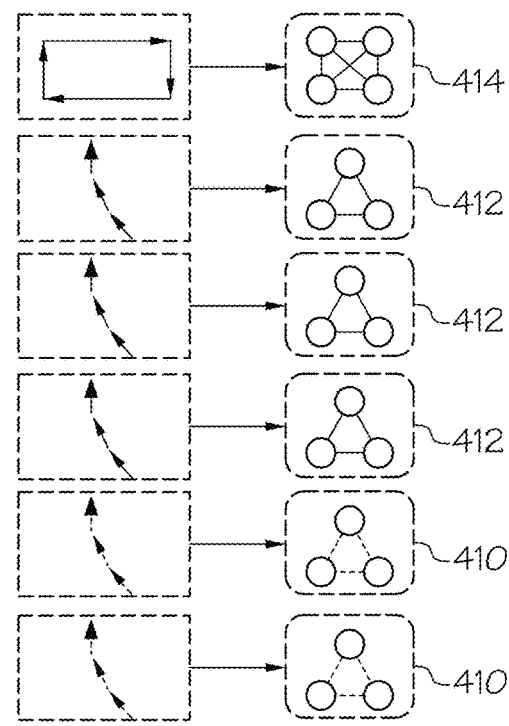
FIG. 4D depicts example polyline subgraphs that may be utilized by the P-ACC server of FIGS. 1 and 3, according to one or more embodiments shown and described herein.

Referring back to FIG. 3, the data vectorization module 318 may convert a raster image generated by the data rasterization module 316 into a vectorized representation of the data contained in the raster image, as shown in FIG. 4C. The vectorized representation may comprise vectors indicating vehicle trajectories 410, and positions of road segments 412, crosswalks 414, and the like. These vectors may represent simpler features than the raster image discussed above. In some examples, the data vectorization module 318 may further utilize a local graph network to convert the vectorized representation to polyline subgraphs, as shown in FIG. 4D. The sequence of polyline subgraphs may be treated as features that may be input to a transformer network, as discussed in further detail below. In other examples, the vectorized representation may be treated as features to be input to a transformer network.

Referring back to FIG. 3, the scenario classification module 320 may classify the features determined by the data vectorization module 318 based on the data received by the vehicle data reception module 314. As described above, the driving behavior of the driver may change in different scenarios. As such, classifying data may allow different transformers to be used based on different driving scenarios in order to learn driver behavior in each of the different scenarios.

In embodiments, the scenario classification module 320 may classify features into a plurality of categories. In embodiments, features may be classified based on the particular driver driving the ego vehicle 104. As such, the P-ACC server 102 may learn the driving behavior of a plurality of different drivers. However, the scenario classification module 320 may also classify features into other categories based on the received data.

In some examples, features may be classified by the type of ego vehicle being driven (e.g., sedan, coupe, truck, SUV, and the like). In some examples, features may be classified by the type of road the ego vehicle 104 is driving on (e.g., freeway, highway, expressway, urban street, rural street, and the like). In some examples, features may be classified by the time of day when data is captured (e.g., morning, afternoon, evening, and the like). In some examples, features may be classified by weather conditions when data is captured (e.g., rain, snow, clouds, fog, amount of visibility, and the like).

In some examples, if the features are unable to be classified into a particular category (e.g., there is insufficient data), the scenario classification module 320 may classify the features into a pre-defined driver type based on a classification algorithm (e.g., k-nearest neighbor). For example, the scenario classification module 320 may classify the features based on a driver type (e.g., aggressive driver, passive driver) that most closely matches the features based on historical data associated with that driver type.

Referring back to FIG. 3, the transformer training module 322 may train a transformer network to predict driver behavior based on the features generated by the data vectorization module 318, as disclosed herein. In particular, the transformer training module 322 may train a transformer network to predict an acceleration of the vehicle 104 driven by a particular driver at a future time step based on the vectorized data associated with the vehicle 104 at a current time step.

A transformer is a deep learning model designed to handle sequential input data. However, a transformer may have advantages over other types of deep learning architectures, such as recurrent neural networks. In particular, a transformer utilizes an attention mechanism to provide context for any position in an input sequence, such that an entire input sequence may be processed simultaneously, rather than sequentially using a memory of previous states as with recurrent neural networks. Accordingly, in embodiments, a transformer may receive, as input, a time series of vehicle data and may predict vehicle trajectories at future time steps. In the illustrated example, a transformer network comprising multiple transformers is used, as disclosed herein.

Figure 5A:
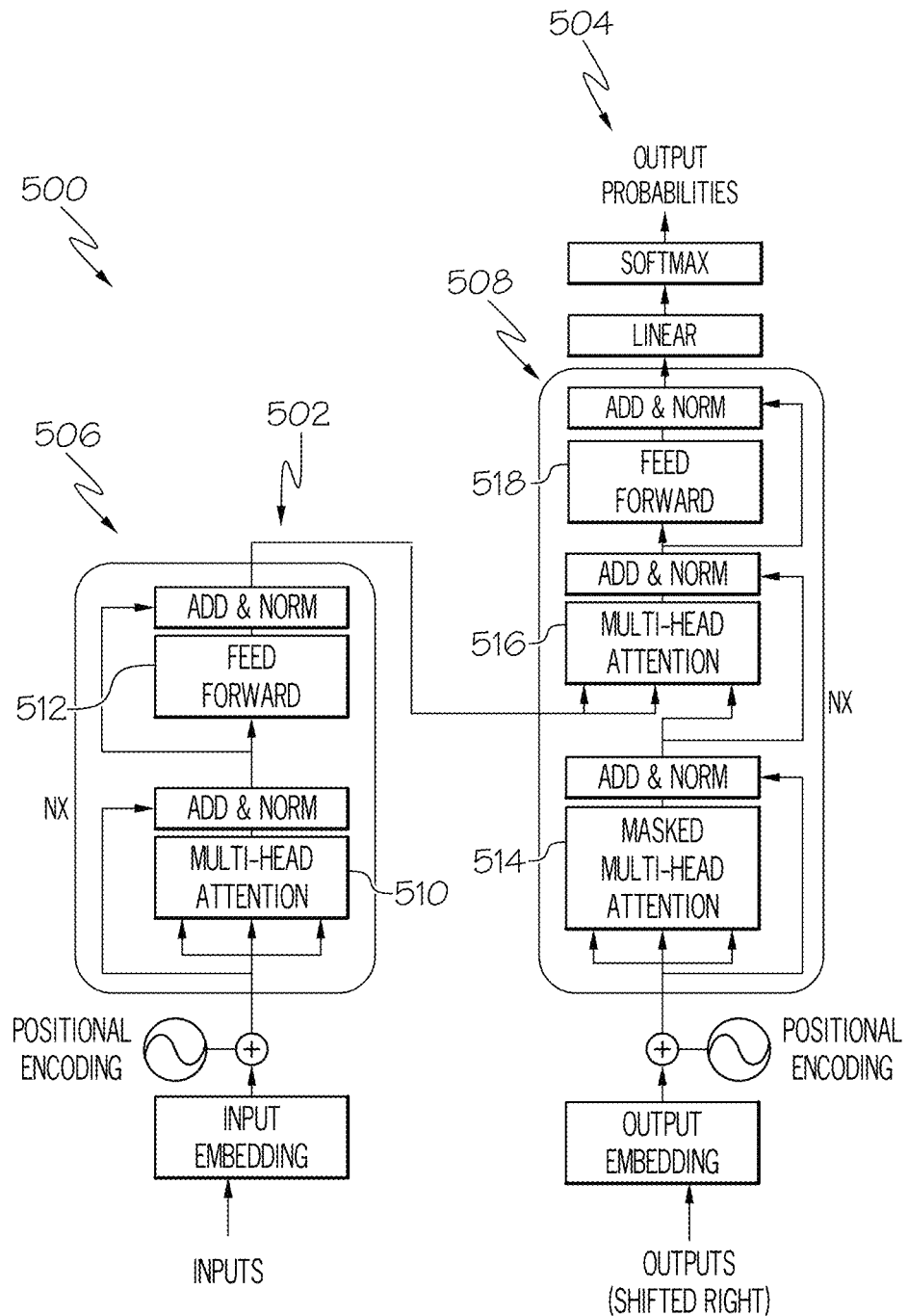
FIG. 5A depicts an example architecture of a transformer that may be utilized by the P-ACC server of FIGS. 1 and 3, according to one or more embodiments shown and described herein.
Figure 5C:
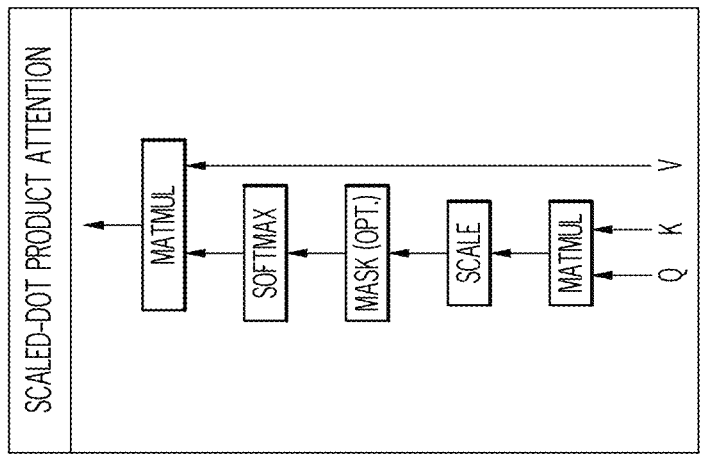
FIG. 5C depicts an example architecture of a scaled dot-product attention layer of the multi-head attention layer of FIG. 5B, according to one or more embodiments shown and described herein.
Figure 5B:
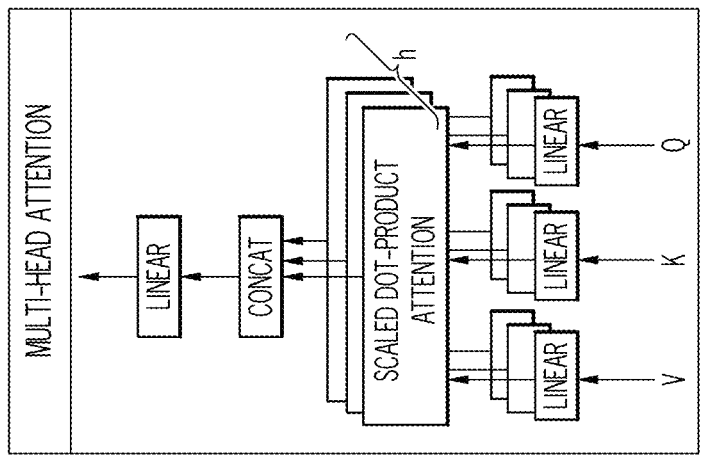
FIG. 5B depicts an example architecture of a multi-head attention layer of the transformer of FIG. 5A, according to one or more embodiments shown and described herein.

FIGS. 5A-5C show an example architecture of a transformer 500 that may be used in embodiments disclosed herein. Specifically, FIGS. 5A-5C show an example architecture for a vanilla transformer. However, in other examples, other transformer architectures may be used. As shown in FIG. 5A, the transformer 500 includes an encoder 502 and a decoder 504. The encoder 502 comprises one or more modules 506 and the decoder 504 comprises one or more modules 508. The modules 506 may be stacked on top of each other and the modules 508 may be stacked on top of each other. Each module 506 of the encoder 502 contains a multi-head attention layer 510 and a feed forward layer 512. Each module 508 of the decoder 504 contains a masked multi-head attention layer 514, a multi-head attention layer 516, and a feed forward layer 518.

FIG. 5B shows an example architecture of a multi-head attention layer from the encoder 502 or the decoder 504. The multi-head attention layer of FIG. 5B includes linear inputs V, K, and Q, a scaled dot-product attention layer, a Concat output, and a Linear output. FIG. 5C shows an example architecture of the scaled dot-product attention layer of FIG. 5B.

Figure 6:
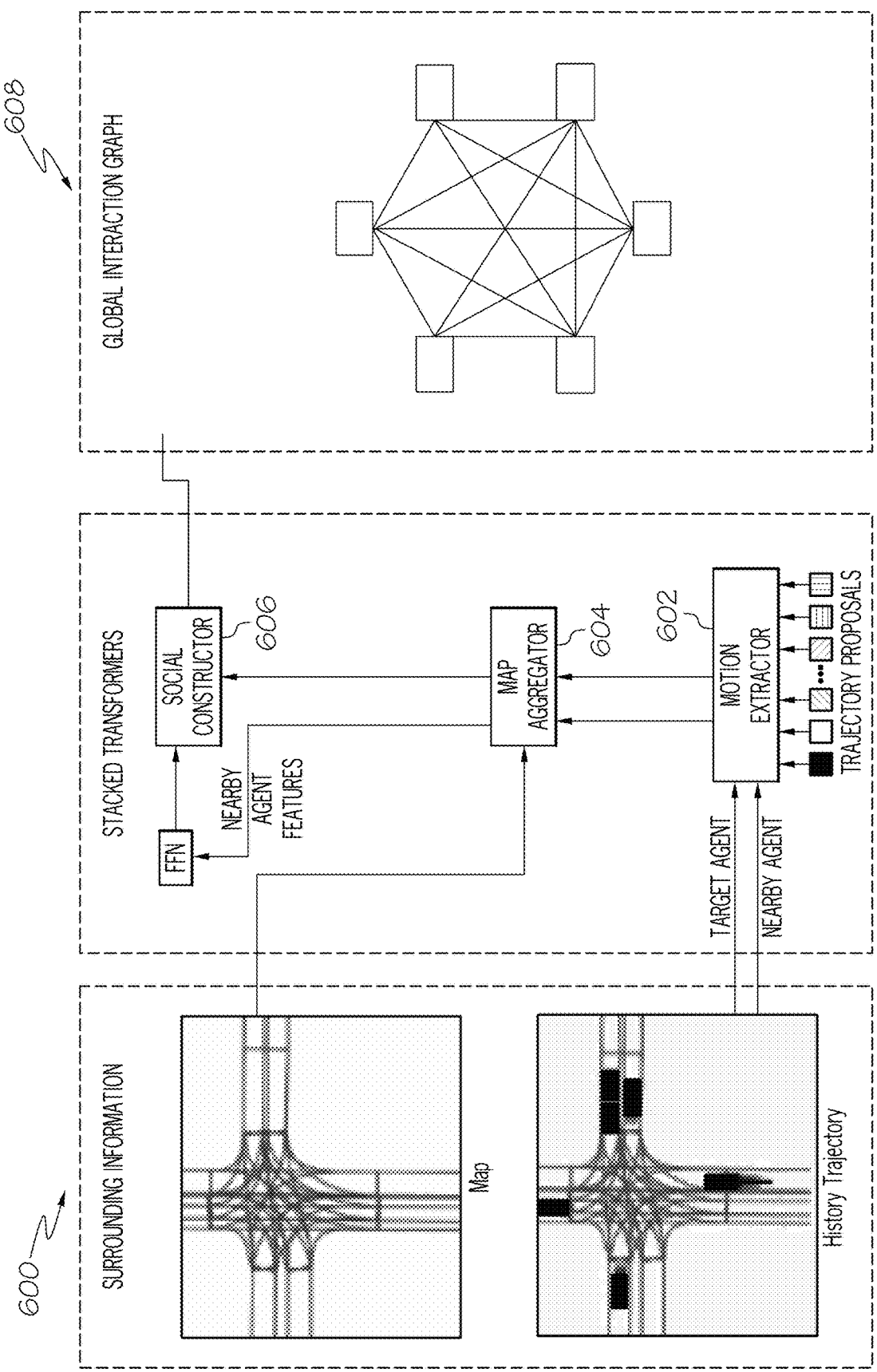
FIG. 6 shows an example architecture of a transformer network that may be utilized by the P-ACC server of FIGS. 1 and 3, according to one or more embodiments shown and described herein.

In the illustrated example, in order to incorporate different types of data including vehicle trajectories and contextual information, multiple transformers are stacked in parallel, as shown in FIG. 6, into a transformer network. In particular, FIG. 6 shows an example transformer network 600 comprising three transformers. The transformer network 600 includes a motion extractor transformer 602, a map aggregator transformer 604, and a social constructor transformer 606. In the illustrated example, the transformer training module 322 generates a number of trajectory proposals for the ego vehicle 104 and other road agents based on the data received by the vehicle data reception module 314. The trajectory proposals represent possible future trajectories for the road agents based on past trajectories.

The motion extractor transformer 602 receives, as input, the trajectory proposals and historical trajectories. The historical trajectories may comprise sequential motion of road agents output by the data vectorization module 318 (e.g., the vehicle trajectories 410 of FIGS. 4C and 4D). The motion extractor transformer 602 generates proposal features based on the inputs to the motion extractor transformer 602.

The proposal features output by the motion extractor transformer 602 may be input to the map aggregator transformer 604 along with map data output by the data vectorization module 318 (e.g., the road segments 412 and crosswalk 414 of FIGS. 4C and 4D). The map aggregator transformer 604 generates proposal features based on the inputs to the map aggregator transformer 604.

The proposal features output by the map aggregator transformer 604 may be input to the social constructor transformer 606. The social constructor transformer 606 models the interactions between the various road agents and road geometry indicated by the data received by the vehicle data reception module 314. The output of the social constructor transformer 606 may be input to a multilayer perceptron to learn high-order interactions regarding polyline features (e.g., the features 410, 412, 414 of FIG. 4D). The social constructor transformer 606 may then output a global interaction graph 608 indicating predicted trajectories of road agents and confidence scores of the predicted trajectories.

Referring back to FIG. 3, the transformer training module 322 may train the transformer network 600 to predict future trajectories of road agents based on training data comprising past driving data collected by the ego vehicle 104. As discussed above, whenever the ego vehicle 104 embarks on a driving trip, the ego vehicle 104 may collect sensor data and may transmit the collected sensor data to P-ACC server 102. As such, over time the P-ACC server 102 may collect a large amount of driving data, which may be used as training data to train the transformer network 600.

Furthermore, as discussed above, the scenario classification module 320 may categorize vehicle data into a variety of categories. Accordingly, the transformer training module 322 may train multiple transformer networks to predict vehicle trajectories based on different categories. For example, one transformer network may be trained on vehicle data gathered during heavy rain, another transformer network may be trained on vehicle data gathered during snowfall, and the like. As such, the transformer training module 322 may train a plurality of transformer networks to predict trajectories in a variety of driving conditions.

The transformer prediction module 324 may utilize a trained transformer network to predict vehicle trajectories based on data received by the vehicle data reception module 314. That is, after a transformer network is trained by the transformer prediction module 324, the trained transformer network may be used to make predictions in real-time based on vehicle data. In some examples, when the transformer training module 322 has trained multiple transformer networks based on different conditions or categories of vehicle data, the transformer prediction module 324 may select the transformer network most appropriate for particular received data.

The actor state prediction module 326 may determine a predicted acceleration of the ego vehicle 104 based on the predicted trajectories output by the transformer prediction module 324, as disclosed herein. As discussed above, the transformer prediction module 324 may output trajectories of vehicles predicted by a trained transformer network. However, the output of the transformer prediction module 324 comprises a vectorized representation of vehicle behavior. Accordingly, the actor state prediction module 326 converts the vectorized representation of vehicle behavior to an actual acceleration of the ego vehicle.

Figure 7:
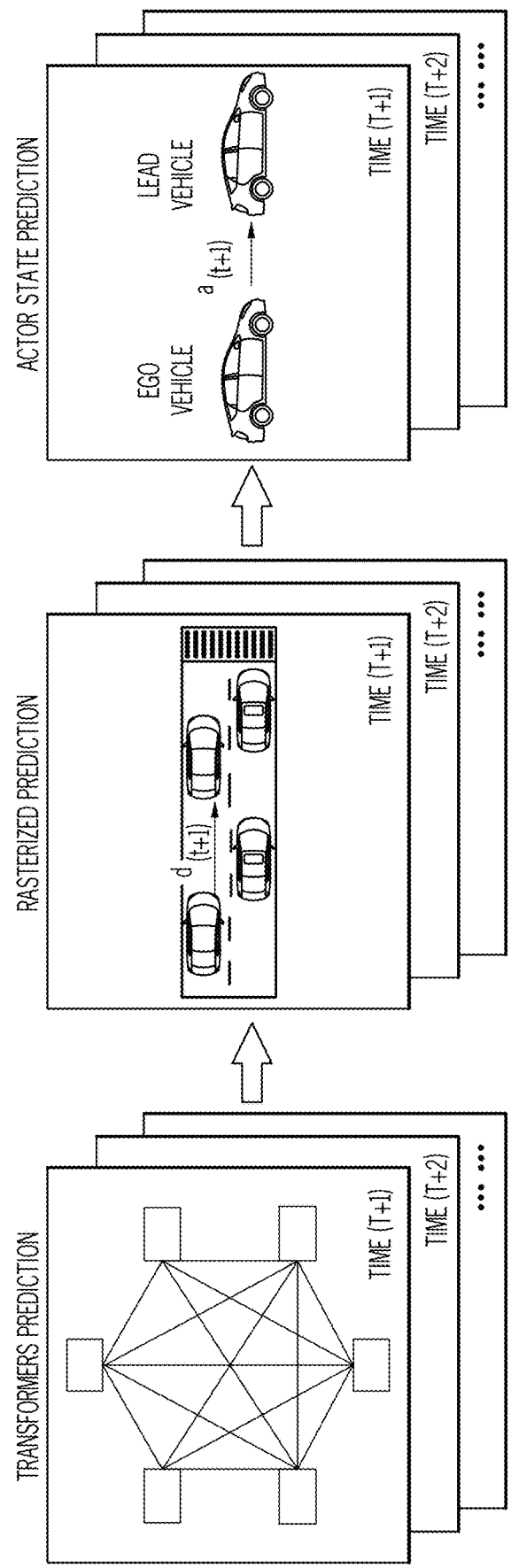
FIG. 7A shows an example transformer prediction that may be generated by the P-ACC server of FIGS. 1 and 3, according to one or more embodiments shown and described herein.
FIG. 7B shows an example rasterized prediction that may be generated by the P-ACC server of FIGS. 1 and 3, according to one or more embodiments shown and described herein.
FIG. 7C shows an example actor state prediction that may be generated by the P-ACC server of FIGS. 1 and 3, according to one or more embodiments shown and described herein.

FIGS. 7A-7C illustrate steps that may be performed by the actor state prediction module 326. FIG. 7A illustrates a plurality of global interaction graphs comprising vectorized representations of vehicle trajectories for a series of future time steps. The actor state prediction module 326 may transform the vectorized representations of vehicle trajectories into rasterized representations (e.g., birds-eye-view) of the vehicle trajectories, as shown in FIG. 7B. The actor state prediction module 326 may then determine a distance between the ego vehicle 104 and a leading vehicle at future time steps based on the rasterized representations of the vehicle trajectories, as shown in FIG. 7C. The actor state prediction module 326 may then determine a predicted acceleration of the ego vehicle 104 based on the distances between the ego vehicle 104 and a leading vehicle at two future time steps.

In particular, the actor state prediction module 326 may predict an acceleration for the ego vehicle 104 using the equation, $$a_{(t+1)} = \frac{d_{(t+2)} - d_{(t+1)}}{(\delta t)^2},$$

where $a_{(t-1)}$ is the acceleration of the ego vehicle at time step t+1, $d_{(t-1)}$ is the distance to the leading vehicle at time step t+1, $d_{(t-2)}$ is the distance to the leading vehicle at time step t+2, and δt is the length of each time step. As such, the actor state prediction module 326 may predict an acceleration of the ego vehicle 104 at a future time step based on collected vehicle data.

Referring back to FIG. 3, the filter module 328 ensures feasibility of the acceleration predicted by the actor state prediction module 326. As discussed above, the actor state prediction module 326 predicts an acceleration that would be implemented by a driver of the ego vehicle 104 at a future time step based on collected vehicle data. A P-ACC system of the vehicle 104 may then cause the vehicle 104 to accelerate at the predicted amount in order to emulate the human driver. However, the actor state prediction module 326 merely considers current vehicle data and does not consider vehicle dynamics. As such, the actor state prediction module 326 may predict an acceleration that does not meet operational constraints or that cannot be executed by the vehicle powertrain given the current vehicle speed. As such, the filter module 328 may ensure that the acceleration $a_{(t-1)}$ satisfies certain predetermined constraints. In particular, the filter module 328 may ensure that the acceleration $a_{(t-1)}$ satisfies the following three equations:

$$\frac{d_{(t+1)}}{v_{(t+1)}^{ego} - v_{(t+1)}^{lead}} \geq t_{collision}, \text{ if } v_{(t+1)}^{ego} > v_{(t+1)}^{lead} \quad \text{Equation (1)}$$

$$d_{(t+1)} \geq d_{clearance} \quad \text{Equation (2)}$$

$$a_{power\_min\_v(t+1)} \leq a_{(t+1)} \leq a_{power\_max\_v(t+1)} \quad \text{Equation (3)}$$

Equation (1) ensures that a time-to-collision value is larger than a threshold value $t_{collision}$ (e.g., 1 second) when the ego vehicle speed $v_{(t+1)}^{ego}$ is larger than the lead vehicle speed $v_{(t+1)}^{ego}$. Equation (2) ensures that the distance between the ego vehicle 104 and the leading vehicle is larger than a threshold clearance value $d_{clearance}$ (e.g., 2 meters). Equation (3) ensures that the acceleration output falls into the available acceleration range of the vehicle powertrain at the speed $v_{(t+1)}$. If the acceleration $a_{(t+1)}$ does not satisfy these constraints, the filter module 328 may modify the acceleration such that the constraints are satisfied.

The driving instruction transmission module 330 transmits an acceleration determined by the actor state prediction module 326 that satisfies the constraints of the filter module 328 to the vehicle 104. If the acceleration determined by the actor state prediction module 326 does not satisfy the constraints of the filter module 328, the driving instruction transmission module 330 may transmit the modified acceleration determined by the filter module 328 that does satisfy the constraints. As such, the P-ACC system of the vehicle 104 may cause the vehicle to perform the predicted acceleration at a future time step to mimic the behavior of the driver.

Figure 8:
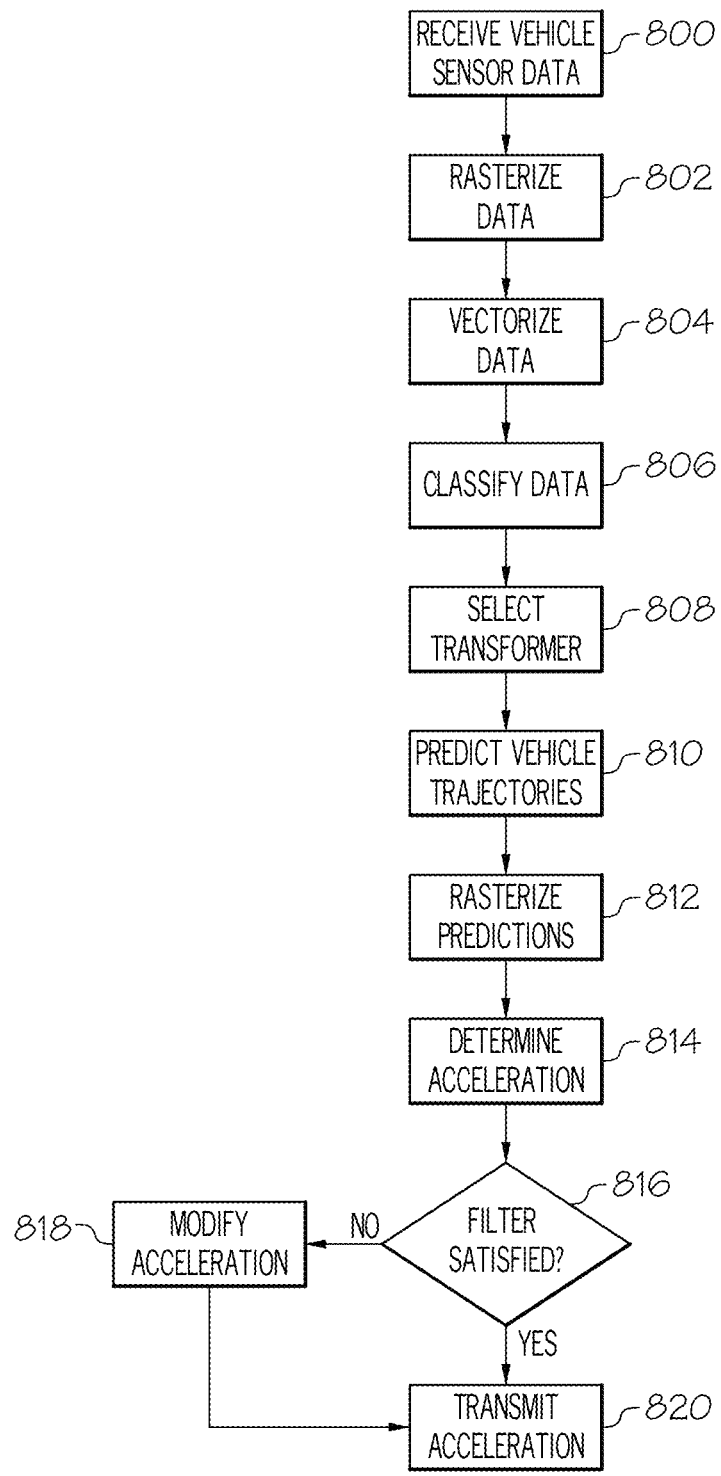
FIG. 8 depicts a flowchart of a method of operating the P-ACC server of FIGS. 1 and 3, according to one or more embodiments shown and described herein.

FIG. 8 depicts a flowchart of an example method for operating the P-ACC server 102 of FIGS. 1 and 3. At step 800, the vehicle data reception module 314 receives vehicle data collected by the vehicle sensors 210 of the ego vehicle 104. The vehicle data may include positions of road agents (e.g., other vehicles), as well as information about road geometry (e.g., shapes and positions of roads or other traffic features).

At step 802, the data rasterization module 316 determines a rasterized representation of the data received by the vehicle data reception module 314. The rasterized representation may comprise a 2D birds-eye view of road agents and road geometry.

At step 804, the data vectorization module 318 determines a vectorized representation of the rasterized data determined by the data rasterization module 316. The vectorized representation may include vectors representing positions and trajectories of road agents and positions of road geometry. In some examples, the vectorized representation may comprise polyline subgraphs.

At step 806, the scenario classification module 320 determines a classification associated with the data received by the vehicle data reception module 314 based on metadata associated with the received data. In particular, the scenario classification module 320 may determine a classification of the data based on a vehicle type, a road type, a time of day, a weather condition, or any combination thereof. In some examples, the scenario classification module 320 may determine a classification of the data based on other scenarios or conditions as well. At step 808, the scenario classification module 320 selects a transformer network based on the classification of the data.

At step 810, the transformer prediction module 324 inputs the vectorized data into the selected transformer network. The transformer network then outputs vectorized data representing predicted future vehicle trajectories based on the vectorized data.

At step 812, the actor state prediction module 326 transforms the vectorized data output by the selected transformer network into rasterized data. At step 814, the actor state prediction module 326 determines a predicted acceleration of the ego vehicle 104 at one or more future time steps based on the rasterized data.

At step 816, the filter module 328 determines whether the acceleration determined by the actor state prediction module 326 satisfies one or more predetermined constraints of the filter module 328. If the filter module 328 determines that the determined acceleration satisfies the predetermined constraints (YES at step 816), then at step 820, the driving instruction transmission module 330 transmits the determined acceleration to the ego vehicle 104, which may cause the ego vehicle 104 to perform the determined acceleration at one or more future time steps.

If the filter module 328 determines that the determined acceleration does not satisfy the predetermined constraints (NO at step 816), then at step 818, the filter module 328 modifies the determined acceleration such that it does satisfy the predetermined constraints. Then, at step 820, the driving instruction transmission module 330 transmits the modified acceleration to the ego vehicle 104, which may cause the ego vehicle 104 to perform the modified acceleration at one or more future time steps.

It should now be understood that embodiments described herein are directed to a method and system for personalized car following transformers. Vehicle sensors may collect data during a plurality of driving trips in which a vehicle is driven by a human driver. This data may be transmitted to a server that may store the data as training data. The data from each driving trip may be classified based on conditions that occurred during the driving trip. When sufficient training data is received by the server, the server may train a transformer network to predict future vehicle trajectories, which indicates predicted driving behavior of the driver based on current driving conditions.

After the transformer network is trained, the driver of the vehicle may utilize a P-ACC system to perform personalized adaptive cruise control that mimics the driver's car-following behavior. While the driver is driving the vehicle using P-ACC, the vehicle may collect sensor data and transmit the sensor data to the server. The server may classify the data based on driving conditions and select an appropriate transformer network based on the driving conditions. The server may transform 3D point cloud data received from the vehicle into one or more 2D raster images, and transform the 2D raster image into a vectorized representation of the data. The vectorized representation of the data may then be input into the selected transformer network, which may output a vectorized representation of predicted future vehicle trajectories.

The vectorized representation of predicted future vehicle trajectories may be transformed into one or more 2D raster images, and the server may determine a predicted acceleration of the vehicle at one or more future time steps based on the raster images. The predicted acceleration represents an amount of acceleration the driver would perform at the future time steps if the driver were driving and not using the P-ACC system. Thus, the server may transmit the predicted acceleration to the vehicle, which may cause the vehicle to perform the acceleration at the future time steps to mimic the driving behavior of the driver. This may make the driver feel more comfortable that the P-ACC system is driving in a way that mimics the preferred driving behavior of the driver.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    determining a vectorized representation of positions of road agents and road geometry based on sensor data from a vehicle;
    determining a classification associated with the sensor data based on metadata associated with the sensor data;
    selecting a trained transformer network based on the classification;
    inputting the vectorized representation of the positions of the road agents and the road geometry into the selected trained transformer network, the transformer network being trained to predict an acceleration of the vehicle that would be performed by a driver at one or more future time steps if the driver were manually driving the vehicle;
    predicting the acceleration of the vehicle at the one or more future time steps based on an output of the selected trained transformer network; and
    causing the vehicle to perform the predicted acceleration at the one or more future time steps.

2. The method of claim 1, wherein the vectorized representation of the positions of the road agents comprises one or more polyline subgraphs.

3. The method of claim 1, further comprising:
    determining a rasterized representation of predicted positions of the road agents at the one or more future time steps based on the output of the transformer network; and
    determining the predicted acceleration of the vehicle at the one or more future time steps based on the rasterized representation of the predicted positions of the road agents at the one or more future time steps.

4. The method of claim 1, wherein:
    the trained transformer network comprises a plurality of transformers;
    a first transformer of the trained transformer network receives, as input, data associated with the positions of the road agents; and
    a second transformer of the trained transformer network receives, as input, data associated with the road geometry.

5. The method of claim 1, wherein the classification is based on at least one of a type of the vehicle, a type of road that the vehicle is driving on, a time of day when the sensor data is collected by the vehicle, and a weather condition when the sensor data is collected by the vehicle.

6. The method of claim 1, further comprising:
    determining whether the predicted acceleration satisfies one or more predetermined constraints; and
    upon determination that the predicted acceleration does not satisfy the one or more predetermined constraints, causing the vehicle to perform a modified acceleration that satisfies the one or more predetermined constraints.

7. The method of claim 1, further comprising:
    receiving sensor data from the vehicle during a plurality of driving trips performed by the vehicle; and using the sensor data from the plurality of driving trips as training data to train the transformer network.

8. The method of claim 7, further comprising:
classifying the sensor data from each of the plurality of driving trips into one or more categories based on metadata associated with the sensor data; and
for each of the one or more categories, using the sensor data associated with that category to train a transformer network associated with that category.

9. The method of claim 1, further comprising:
determining a rasterized representation of the positions of the road agents and the road geometry based on the sensor data from the vehicle; and
determining the vectorized representation of the positions of the road agents and the road geometry based on the rasterized representation of the positions of the road agents and the road geometry.

10. A remote computing device comprising a controller programmed to:
determine a vectorized representation of positions of road agents and road geometry based on sensor data from a vehicle;
determine a classification associated with the sensor data based on metadata associated with the sensor data;
select a trained transformer network based on the classification;
input the vectorized representation of the positions of the road agents and the road geometry into the selected trained transformer network, the transformer network being trained to predict an acceleration of the vehicle that would be performed by a driver at one or more future time steps if the driver were manually driving the vehicle;
predict the acceleration of the vehicle at the one or more future time steps based on an output of the selected trained transformer network; and
cause the vehicle to perform the predicted acceleration at the one or more future time steps.

11. The remote computing device of claim 10, wherein the vectorized representation of the positions of the road agents comprises one or more polyline subgraphs.

12. The remote computing device of claim 10, wherein the controller is further programmed to:
determine a rasterized representation of predicted positions of the road agents at the one or more future time steps based on the output of the transformer network; and
determine the predicted acceleration of the vehicle at the one or more future time steps based on the rasterized representation of the predicted positions of the road agents at the one or more future time steps.

13. The remote computing device of claim 10, wherein:
the trained transformer network comprises a plurality of transformers;
a first transformer of the trained transformer network receives, as input, data associated with the positions of the road agents; and
a second transformer of the trained transformer network receives, as input, data associated with the road geometry.

14. The remote computing device of claim 10, wherein the classification is based on at least one of a type of the vehicle, a type of road that the vehicle is driving on, a time of day when the sensor data is collected by the vehicle, and a weather condition when the sensor data is collected by the vehicle.

15. The remote computing device of claim 10, wherein the controller is further programmed to:
determine whether the predicted acceleration satisfies one or more predetermined constraints; and
upon determination that the predicted acceleration does not satisfy the one or more predetermined constraints, cause the vehicle to perform a modified acceleration that satisfies the one or more predetermined constraints.

16. The remote computing device claim 10, wherein the controller is further programmed to:
receive sensor data from the vehicle during a plurality of driving trips performed by the vehicle; and
use the sensor data from the plurality of driving trips as training data to train the transformer network.

17. The remote computing device claim 16, wherein the controller is further programmed to:
classify the sensor data from each of the plurality of driving trips into one or more categories based on metadata associated with the sensor data; and
for each of the one or more categories, use the sensor data associated with that category to train a transformer network associated with that category.

18. A system comprising:
a vehicle comprising one or more vehicle sensors configured to collect sensor data comprising positions of road agents at a plurality of time steps and road geometry; and
a remote computing device comprising a controller programmed to:
determine a vectorized representation of the positions of the road agents and the road geometry based on the sensor data from the vehicle;
determine a classification associated with the sensor data based on metadata associated with the sensor data;
select a trained transformer network based on the classification;
input the vectorized representation of the positions of the road agents and the road geometry into the selected trained transformer network, the transformer network being trained to predict an acceleration of the vehicle that would be performed by a driver at one or more future time steps if the driver were manually driving the vehicle; and
predict the acceleration of the vehicle at the one or more future time steps based on an output of the selected trained transformer network,
the vehicle configured to:
receive the predicted acceleration and perform the predicted acceleration at the one or more future time steps.

* * * * *

UNITED STATES PATENT AND TRADEMARK OFFICE
CERTIFICATE OF CORRECTION

| | | |
|---|---|---|
| PATENT NO. | : 12,083,883 B2 | Page 1 of 1 |
| APPLICATION NO. | : 17/567504 | |
| DATED | : September 10, 2024 | |
| INVENTOR(S) | : Ziran Wang et al. | |

It is certified that error appears in the above-identified patent and that said Letters Patent is hereby corrected as shown below:

In the Specification

In Column 11, Line 34, delete "$a_{(t-1)}$" and insert --$a_{(t+1)}$--, therefor.

In Column 11, Line 35, delete "$d_{(t-1)}$" and insert --$d_{(t+1)}$--, therefor.

In Column 11, Line 36, delete "$d_{(t-2)}$" and insert --$d_{(t+2)}$--, therefor.

In Column 11, Line 56, delete "$a_{(t-1)}$" and insert --$a_{(t+1)}$--, therefor.

In Column 11, Line 58, delete "$a_{(t-1)}$" and insert --$a_{(t+1)}$--, therefor.

In the Claims

In Column 16, Line 15, Claim 16, before "claim", insert --of--.

In Column 16, Line 21, Claim 17, before "claim", insert --of--.

Signed and Sealed this
Twentieth Day of May, 2025

Coke Morgan Stewart
*Acting Director of the United States Patent and Trademark Office*